June 1, 1971     W. B. DRAGAN     3,581,399

COMPOSITE RESIN FILLING SYRINGE AND TECHNIQUE

Filed Aug. 8, 1969

INVENTOR.
WILLIAM B. DRAGAN
BY
Arthur F. Lattibeau
ATTORNEY

United States Patent Office 3,581,399
Patented June 1, 1971

3,581,399
COMPOSITE RESIN FILLING SYRINGE AND TECHNIQUE
William B. Dragan, Fairfield, Conn., assignor to Centrix, Inc., Easton, Conn.
Filed Aug. 8, 1969, Ser. No. 848,421
Int. Cl. A61c 5/04
U.S. Cl. 32—60     10 Claims

ABSTRACT OF THE DISCLOSURE

This disclosure is directed to a dental material carrier and an applicator gun therefor. The dental material carrier comprises a nozzle pre-loaded with a predetermined amount of a dental filling material and having a displaceable piston to effectively seal the dental material within the nozzle until used. Operatively associated with the pre-loaded nozzle is an applicator gun adapted to detachably receive the pre-loaded nozzle and having a plunger for effecting displacement of the piston to extrude the filling material from the carrier as desired.

PROBLEM

Heretofore extreme difficulty had been encountered by dentists in applying a filling material in a prepared cavity. Generally the filling material was applied to a prepared cavity by a palate or similar tool. Consequently the tooth or cavity was filled from the outside in with this technique. The disadvantage of this technique is that it was conducive to the formation of voids within the cavity. This was because the palate technique of packing a filling material could not satisfactorily get the material into small and difficult to get at areas. Also there was a tendency for air bubbles to form as a result of the packing. With the more recent composite type resin filling material, packing of the material with a palate was further handicapped in that the material tended to stick to the palate. Consequently the material would pull out of the cavity when the packing palate was removed. Also some filling material tended to discolor when placed in contact with the metal of a palate tool; thereby resulting in undesirable discoloration of the filling. This discoloration effect was of a particular disadvantage when such technique was used on a filling in the front teeth.

OBJECTS

It is an object of this invention to provide a dental material carrier and applicator therefor whereby a cavity can be filled by a controlled flow-in method, i.e., filled from the inside out so as to eliminate the formation of voids or air bubbles within the cavity fill.

Another object is to provide an applicator for a dental filling material in which a pre-loaded nozzle or tip is rendered readily detachable and disposable with respect to the applicator.

Another object is to provide a dental carrier and applicator therefor in which the material can be readily and accurately applied to a desired area and in readily controllable amounts.

Another object is to provide a dental material carrier in the form of a disposable nozzle which is pre-loaded with a predetermined amount of the dental material that is sealed within the carrier by a displaceable piston which is also adapted for extruding the material from the nozzle when displaced.

BRIEF SUMMARY OF THE INVENTION

The foregoing objects, features and advantages are attained by a readily disposable carrier for a dental filling material which is in the form of a nozzle which is pre-loaded with a predetermined amount of a dental filling material. The predetermined amount of material is sealed within a reservoir portion of the nozzle by a displaceable piston.

An applicator gun is provided for effecting the controlled discharge of the material from the pre-loaded nozzle. The applicator gun comprises essentially of a barrel housing having an end wall portion for detachably accommodating the preloaded nozzle. Reciprocally mounted within the barrel of the gun applicator is a plunger having an actuating projection arranged in axial alignment with the displaceable sealing piston of the nozzle.

Upon actuation of the plunger toward the nozzle tip, the actuating projection is brought in contact with the piston to effect displacement thereof. In doing so the material is extruded from the discharge opening of the nozzle. Preferably the discharge opening is angularly disposed relative to the reservoir portion of the nozzle so as to provide for ease of access to otherwise difficult to reach areas.

FEATURES

A feature of this invention resides in the provision of a readily disposable carrier for a dental filling material which is in the form of a nozzle pre-loaded with a predetermined amount of the dental filling material.

Another feature resides in the provision of a dental applicator gun constructed so as to render a pre-loaded nozzle readily attachable thereto, and which is provided with a means for effecting a controlled discharge of the dental filling material therefrom.

Another feature resides in the provision of a dental material carrier and applicator therefor for obtaining an accurate and controlled dispensing of the material in which a prepared cavity can be filled from the inside out so as to eliminate voids.

Other features and advantages will become more readily apparent when considered in view of the drawings and specification in which.

Figure 4:
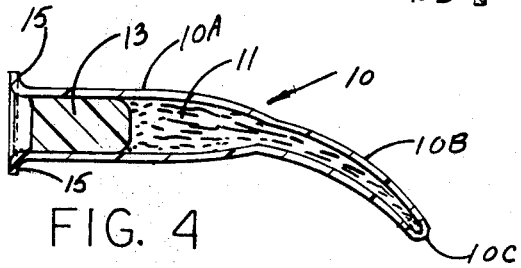
FIG. 4 is an enlarged detail view of a pre-loaded nozzle carrier for the dental filling material.
Figure 3:
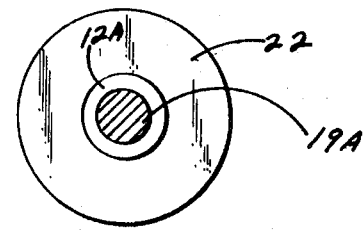
FIG. 3 is an end view taken view taken along line 3—3 on FIG. 1.

Referring to the drawing there is shown a nozzle or carrier 10 which is pre-loaded with a predetermined amount of dental filling material 11, e.g. composite resins such as Adaptis, Addent, etc.; and an applicator gun 12 for ejecting the material 11 therefrom as may be required. The nozzle or carrier 10 is preferably formed of a clear plastic material so as to be rendered readily disposable. The nozzle or carrier 10 is defined by a body having a tubular reservoir portion 10A which is adapted to contain the major amount of the predetermined measure of dental filling material 11. Integrally connected to the reservoir portion 10A of the carrier is a discharging tip end 10B. As shown, the discharging tip 10B progressively diminishes in cross-section from the inlet end to the outlet end thereof. It will be understood that the carrier or nozzle 10 may be made by molding or drawing. Accordingly the tip end 10C of the discharge tip 10B may be initially sealed as indicated in FIG. 4 or may be formed with a preformed orifice opening. However, it will be understood that an orifice opening of the form of FIG. 4 may be readily formed by simply cutting off the closed end 10C along any intermediate point along the discharge tip 10B depending upon the size of OD desired for the orifice opening. Thus the closer the cut is made to the reservoir portion 10A of the carrier, the larger will be the diameter of the orifice. To facilitate access to hard to reach areas, it is preferred that the discharge tip 10B be angularly disposed relative to the longitudinal axis of the reservoir portion 10A as shown.

To seal the material within the carrier 10 a piston 13 is displaceably disposed adjacent the open end of the carrier. The peripheral surface of the piston 13 is disposed in frictional sliding contact with the interior walls of the reservoir portion 10A so as to form an effective seal.

As viewed in FIG. 4, the carrier 10 comprises a preloaded capsule having a precisely measured amount of dental filling material contained therein. Depending on the nature of the dental filling material the nozzle capsule 10 illustrated in FIG. 4 can be readily sold and distributed as shown.

Alternatively the nozzle 10 may be preformed with an orifice opening 14. In such event the nozzle is filled by the dentist with a suitable dental material immediately before applying material to a prepared cavity. Upon filling the capsule the dentist seals off the open end to the reservoir portion 10A by a piston or plug 13. The plug or piston 13 may be formed of an inert material, as for example, rubber, plastic or the like. The end of the reservoir is flared or flanged at 15 as indicated to provide a stop as will be hereinafter described.

Figure 1:
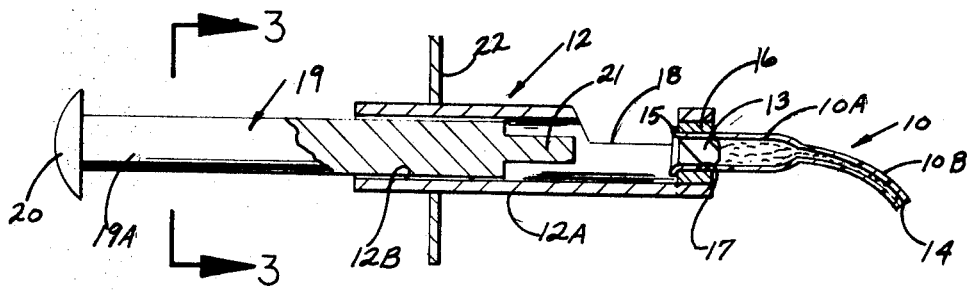
FIG. 1 is a side view of the dental carrier and applicator gun illustrated partly in section showing the plunger in the inoperative position.
Figure 2:
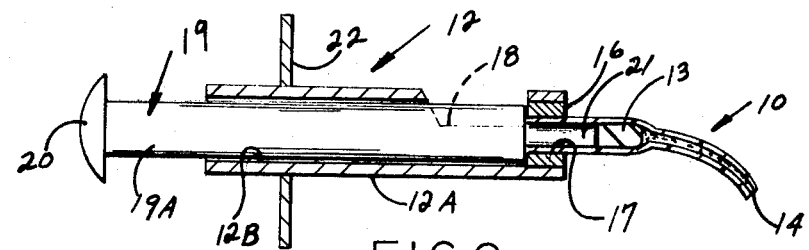
FIG. 2 is a view similar to that of FIG. 1 but illustrating the plunger in the advanced material ejecting position.

To effect a controlled discharge of the material 11 within the nozzle or carrier 10 in filling a prepared cavity, there is provided an applicator gun 12. Referring to FIGS. 1 and 2, the applicator gun 12 comprises a barrel type housing 12A formed of a tubular member having an end wall 16 disposed at one end of the member 12A. The end wall 16 is provided with an aperture or opening 17 sized to receive the reservoir portion 10A of the carrier or nozzle 10. As seen in FIGS. 1 and 2 the nozzle or pre-loaded carrier 10 is inserted through the opening 17 so that the flared or flanged portion 15 is disposed in abutting relationship to the end wall 16. The size of the opening 17 is shaped so as to frictionally receive the reservoir portion 10A of the nozzle 10.

To facilitate the insertion of the nozzle 10 through the opening 17 in the end wall 16, the barrel or housing 12A is provided with a cut-out to define a breach loading opening 18 adjacent the end wall 16. Accordingly it will be noted that the pre-loaded nozzle 10 can be readily inserted through the opening 17 through the breach access 18.

A plunger 19 is slidably disposed within the bore 12B of the housing 12A for movement toward and away from the pre-loaded carrier 10. As shown the plunger 19 comprises an elongated body portion 19A having a push-knob 20 connected to the extended end thereof and an actuating projection 21 connected to the other end.

The projection 21 is arranged so as to be disposed in axial alignment with the piston 13 sealing the dental material 11 within the carrier 10. To eject or discharge the material 11, the plunger 19 is pushed into the barrel so that the projection 21 is urged against the end of the piston 13. Accordingly, the piston 13 is pushed ahead of the projector 21 of the plunger 19 as the latter is pushed inwardly of the barrel. The material is thus forced out the orifice 14 defined in the end of the discharge tip 10B. It will be understood that the piston 13 defines a sufficient seal so that the material is forced out the orifice 14 of the discharge tip 10B upon displacement thereof.

To facilitate gripping of the applicator 12 a circular finger grip 22 or guard is provided about the barrel. Accordingly the applicator 12 can be readily gripped between the index and middle finger behind the finger grip 22 and the thumb placed on the push knob 20 to effect displacement of the plunger. The plunger 19 and the bore 12B of the barrel are formed so as to provide for a smooth and firm sliding relationship therebetween so as to provide the dentist with the proper feel for controlling the rate of discharge of the dental material 11.

With the carrier 10 and applicator gun 12 described, a dentist is now capable of using the flow technique to fill cavities from the inside out, and thereby avoid the formation of bubbles or voids in the filling material. Also the carrier and applicator facilitates the handling of the newer composite resins which are gaining favor with dentists as the better of the known restorative filling material. The carrier and applicator greatly facilitate the handling of these new composite resins which are otherwise difficult to handle with a palate and/or are reactive with metal.

With the nozzle type pre-loaded capsule it will be understood that they can be made in a plurality of predeterminate sizes, each containing a specific amount of dental filling material. In this manner the dentist will have readily available the precise amount of material needed for a particular filling or cavity, thereby enabling the dentist to avoid needless waste of otherwise valuable filling material.

While the carrier and applicator is particularly useful in handling the newer composite resin filling material, the same may be also used for placing acrylic fillings in cavities with the same flow technique. Also the instrument described may be used for the placing of the various types of cements in a cavity, e.g. Cryphosphate of zinc cement, canborphate cement, Temnex, Dycal, root canal cements and calcium hydroxide.

The instrument can also be used to apply rubber base or silicone into extremely small areas such as a post hole; and the placing of a suitable liquid onto a precise area.

Figure 5:
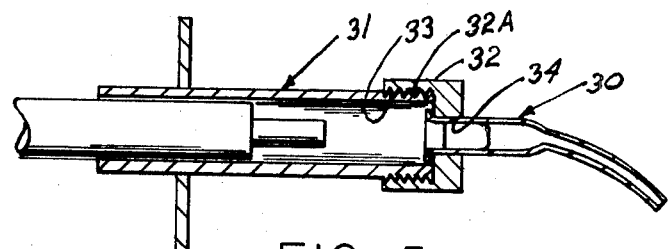
FIG. 5 is a modified embodiment of the invention.

FIG. 5 illustrates a modified form of the invention. In this form of the invention the carrier 30 is similar in construction as hereinbefore described. However, the applicator housing 31 is modified to include a detachable end wall 32 to illustrate another means for facilitating the loading of the nozzle capsule or carrier 30 thereto. In this form the end wall 32 is formed in the nature of a cap having a threaded portion 32A adapted to mate with complementary threads 33 formed on the end of the barrel 31. As shown, the end cap 32 is provided with an aperture or opening 34 to accommodate the nozzle 30. Thus to effect the positioning of the nozzle 30 in the applicator, the end wall or cap 32 is unthreaded, the nozzle place in the opening 34 as indicated, and the cap 32 and nozzle 30 rethread on the barrel 31. In all other respects the construction and operation is similar to that described with respect to FIGS. 1 to 4.

Figure 6:
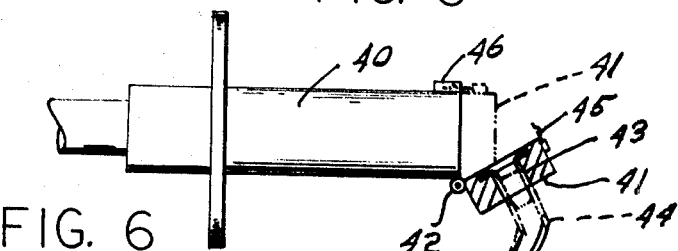
FIG. 6 is another modified embodiment of the invention.

FIG. 6 illustrates another housing or barrel modification. In this embodiment the barrel 40 is provided with an end wall or cap 41 which is pivotally connected to the end of the barrel 40 by a hinge 42. As previously described, the end cap or wall 41 has an opening 43 for accommodating the nozzle 44. The end wall or cap 41 also has a detent 45 which is adapted to engage a catch 46 in the operative position as shown by the dash-dot line position.

To effect replacement or positioning of the nozzle 44 in opening 43 the dentist need only to unlatch the dentent 45 and pivot the end wall 41 to the solid line showing. In all other respects the construction and operation of the applicator gun of this embodiment is similar to that previously described.

While the invention has been described with respect to several embodiments, it will be understood and appreciated that variations and modifications may be made without departing from the spirit or scope of the invention.

What is claimed is:

1. Dental gun for effecting a flow technique or position a predetermined quantity of a flowable, solid filling material in a tooth for restorative dentistry comprising:
means defining a barrel housing,
said housing having an end wall formed with an aperture therein,
said housing having a longitudinally extending cut-out portion adjacent said end wall,
a nozzle means pre-loaded with a predetermined amount of filling material,
said nozzle means being inserted in said aperture througs said cut-out portion so as to project beyond said end wall,
said nozzle means including a tubular body portion defining a reservoir for containing a predetermined amount of filling material,
said body portion having a full opened end for charging said reservoir with a filling material,
an outwardly extending flange circumscribing the full open end of said body portion,
said nozzle means including a discharge tip connected to the other end of said tubular body portion,
said discharge tip having an inlet end and an outlet end,
said inlet end being in open communication with the reservoir of said body portion,
said discharge end progressively decreasing in cross-section from the inlet end to the outlet end thereof,
said aperture being sized to snugly receive the body portion of said nozzle means,
said flanged end of said nozzle means being adapted to bear against said end wall to maintain said nozzle in position relative to said end wall,
a resilient free piston disposed in frictional sliding contact with the internal walls of said body portion to seal said full open end,
a plunger means reciprocally mounted within said housing,
said plunger means including an end portion arranged to abut said free piston to effect displacement thereof within said reservoir whereby said piston is displaced in one direction only to effect a controlled discharge of the filling material from said nozzle.

2. The invention as defined in claim 1 wherein said nozzle means is formed of a relatively inexpensive transparent material so as to render it readily expendible.

3. The invention as defined is claim 1 wherein said discharge tip is angularly disposed relative to the connected body portion.

4. A dental gun for effecting a flow technique of positioning a predetermined quantity of a flowable, solid filling material in a tooth for restorative dentistry comprising:
means defining a barrel housing,
an end cap detachably connected to one end of said housing,
said end cap having an opening formed therein,
said end cap being detachably connected with the end of said housing,
a nozzle means pre-loaded with a predetermined amount of filling material,
said pre-loaded nozzle means being retained to said barrel housing by being inserted through said opening in said end cap,
said nozzle means including a tubular barrel portion defining a reservoir for containing a predetermined amount of filling material,
said tubular body portion being extended through and beyond said opening,
said body portion having a full open end for charging said reservoir with a filling material,
said body portion being formed of an inexpensive, transparent material to render said body portion readily expendible,
an outwardly extending flange circumscribing the full open end of said body portion,
said nozzle means including a discharge tip connected to the other end of said tubular body portion,
said discharge tip having an inlet end and an outlet end,
said inlet end being in open communication with the reservoir of said body portion,
said discharge end progressively decreasing in cross-section from the inlet end to the outlet end thereof,
said opening in the end cap being sized so as to snugly receive the body portion of said nozzle means,
said flanged end of said nozzle means being disposed to bear against the end cap to prohibit the nozzle means from becoming detached therefrom,
a resilient free piston disposed in frictional sliding contact with the internal walls of said body portion to seal the full open end thereof,
a plunger means reciprocally mounted within said housing,
said plunger means including an end portion arranged to abut said piston to effect the displacement thereof within said reservoir whereby said piston is displaced in one direction only to effect a controlled discharge of the filling material from said nozzle when said plunger is urged against said piston.

5. The invention as defined in claim 4 wherein said end cap and adjacent end of said barrel housing have complementary mating means for detachably connecting said end cap to said barrel housing.

6. The invention as defined in claim 4 including means for hingedly connecting said end cap to said tubular member for swinging between open and closed positions,
and means for locking said end cap to said tubular means.

7. The invention as described in claim 4 wherein said discharge tip is angularly disposed relative to said reservoir portion.

8. A carrier and applicator for dental filling material for effecting restorative dentistry comprising:
an elongated tubular housing having means defining an end wall at one end and an opening at the other end,
said end wall means being provided with an aperture,
a disposable plastic, transparent nozzle means pre-loaded with a predeterminate amount of filling material being detachably connected to said end wall means so as to extend through the aperture formed therein,
said nozzle means including a reservoir portion disposed in axial alignment with the aperture of said end wall means, said reservoir portion having a full open end adapted to receive a bulk supply of said filling material,
said reservoir portion having a laterally extending flange circumscribing said full open end,
said flange being disposed to bear against said end wall to retain said nozzle in position in said housing,
a free piston disposed in said reservoir portion to seal the inlet end thereto,
said piston being displaceably disposed within said reservoir portion,
a discharge tip end connected to said reservoir portion,
said discharge tip being progressively tapered from inlet to outlet thereof,
a finger grip connected to said barrel housing adjacent the open end thereof,
a plunger reciprocally mounted within said housing,
said plunger having a longitudinally extending projection connected to the inner end thereof,
said projection being disposed an axial alignment with the piston in said nozzle whereby said projecting is adapted to abut with said free piston and effect displacement of said piston within said reservoir portion to extrude the filling material through the discharge tip of said nozzle means,
and means formed on said barrel housing to facilitate the insertion and removal of the nozzle means therefrom.

9. The invention as defined in claim 8 wherein said last mentioned means comprises a breach opening formed in the tubular housing adjacent said end wall.

10. A carrier for dental material comprising:
a plastic transparent body defining a capsule including a reservoir portion having a full open end and a connected discharge tip portion,
the discharge end of said tip being initially sealed,
a predetermined amount of dental filling material disposed within the reservoir portion of said body,
said discharge end defining a nozzle for directing the discharge of the filling material adapted to be contained in said capsule when the tip is severed,
a laterally and outwardly extending flange circumscribing the said full end opening,
a displaceable free piston sealing said material within said tubular member whereby said material is rendered dischargeable by separating the initially sealed tip end and effecting displacement of said piston toward the tip portion,
and said tip end being angularly disposed with respect to said reservoir portion, and
said tip end tapering inwardly toward the initially sealed tip end.

References Cited

UNITED STATES PATENTS

| | | | |
|---|---|---|---|
| 1,188,417 | 6/1916 | Dalbey | 32—60 |
| 2,917,830 | 12/1959 | Cerveris | 32—60 |
| 2,996,223 | 8/1961 | Dolezzi et al. | 128—272X |
| 3,307,548 | 3/1967 | Kachergis | 222—327X |
| 3,367,545 | 2/1968 | Cook | 222—327X |

ROBERT PESHOCK, Primary Examiner